(12) United States Patent
Moore

(10) Patent No.: US 11,035,572 B2
(45) Date of Patent: Jun. 15, 2021

(54) HEAT SHIELD PANEL MANUFACTURING PROCESS

(71) Applicant: United Technologies Corporation, Farmington, CT (US)

(72) Inventor: Jon Moore, Charlottesville, VA (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 250 days.

(21) Appl. No.: 16/021,385

(22) Filed: Jun. 28, 2018

(65) Prior Publication Data
US 2020/0003419 A1    Jan. 2, 2020

(51) Int. Cl.
| F23R 3/04 | (2006.01) |
| B32B 3/26 | (2006.01) |
| B32B 15/01 | (2006.01) |
| B32B 37/18 | (2006.01) |
| B32B 38/10 | (2006.01) |
| F23R 3/00 | (2006.01) |

(52) U.S. Cl.
CPC ............... *F23R 3/04* (2013.01); *B32B 3/266* (2013.01); *B32B 15/01* (2013.01); *B32B 37/18* (2013.01); *B32B 38/10* (2013.01); *F23R 3/002* (2013.01); *B32B 2307/30* (2013.01); *F23R 2900/00018* (2013.01); *F23R 2900/03043* (2013.01); *F23R 2900/03044* (2013.01)

(58) Field of Classification Search
CPC ......... B32B 3/266; B32B 15/01; B32B 37/18; B32B 38/10; B32B 2307/30; F23R 2900/00018; F23R 2900/03043; F23R 2900/03044; F23R 3/04; F23R 3/002
See application file for complete search history.

(56) References Cited

U.S. PATENT DOCUMENTS

| 5,499,499 A | 3/1996 | Ambrogi et al. |
| 5,737,922 A * | 4/1998 | Schoenman ............ F23R 3/002 60/752 |
| 9,719,684 B2 | 8/2017 | Pinnick et al. |
| 9,879,861 B2 | 1/2018 | Pinnick et al. |

FOREIGN PATENT DOCUMENTS

| EP | 1635119 A2 | 3/2006 |
| EP | 2716396 A1 | 4/2014 |
| EP | 3112755 A1 | 1/2017 |

OTHER PUBLICATIONS

The Extended European Search Report for Application No. 19183457. 1-1009; Report dated Nov. 6, 2019; Report Received Date:Nov. 14, 2019; 7 pages.

* cited by examiner

*Primary Examiner* — Moshe Wilensky
(74) *Attorney, Agent, or Firm* — Cantor Colburn LLP

(57) ABSTRACT

A method of manufacturing a heat shield panel for a gas turbine engine comprising: determining a plurality of layers to compose a heat shield panel having one or more cooling apertures with complex geometries; forming each of the plurality of layers into sheets; forming each of the sheets into a three-dimensional slice of the heat shield panel; stacking each of the sheets to form a three-dimensional heat shield panel; and joining the sheets together.

9 Claims, 8 Drawing Sheets

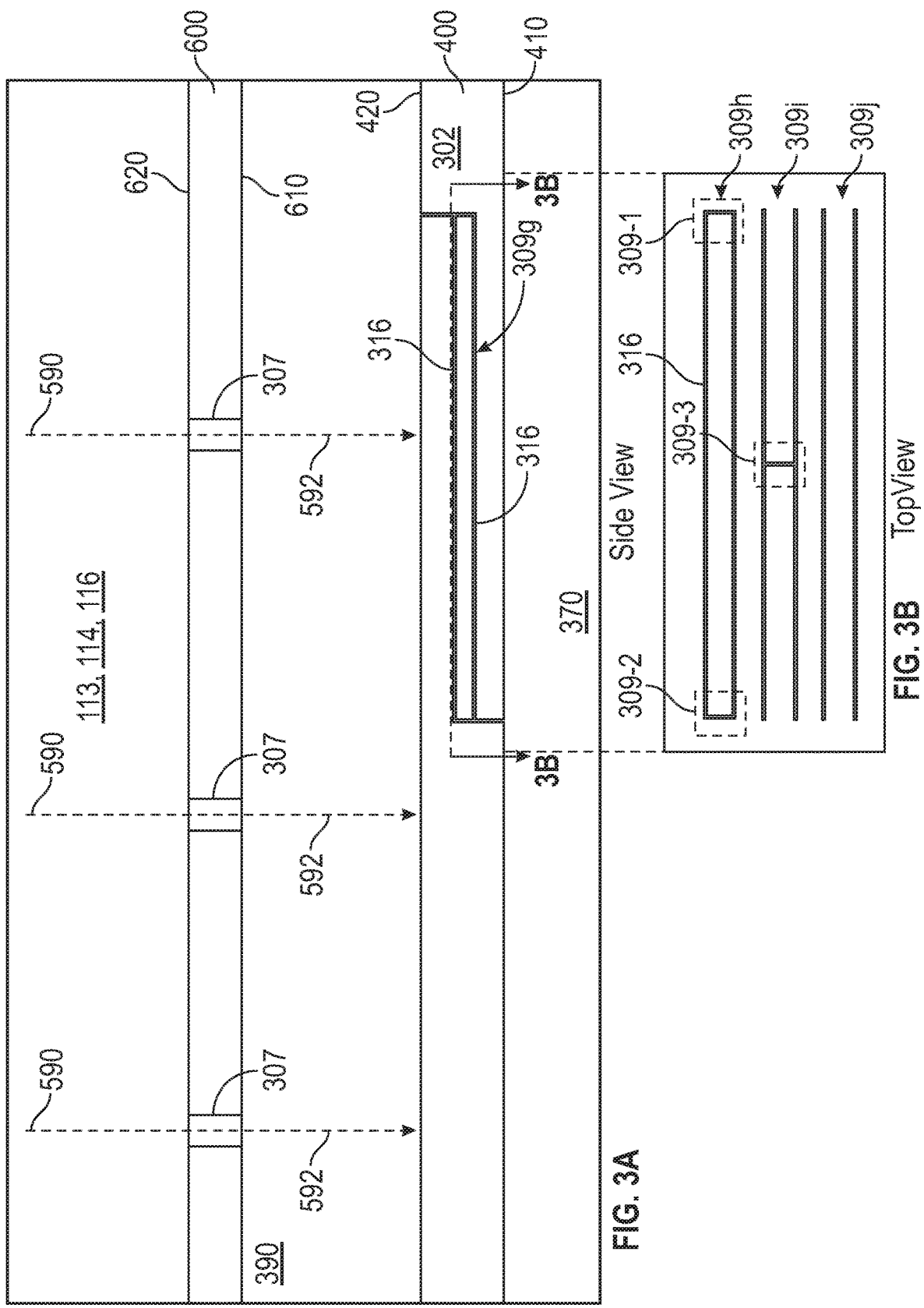

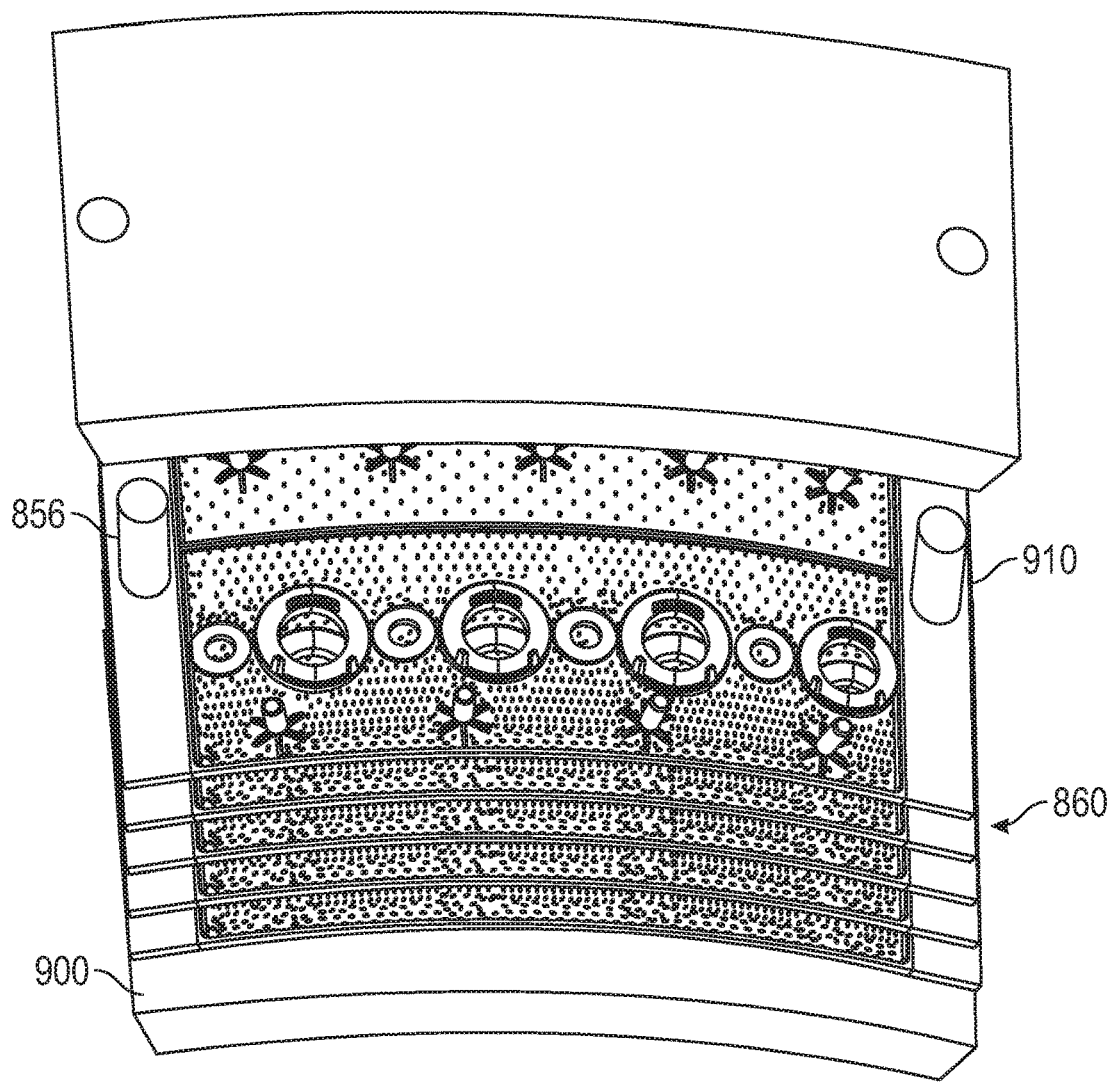
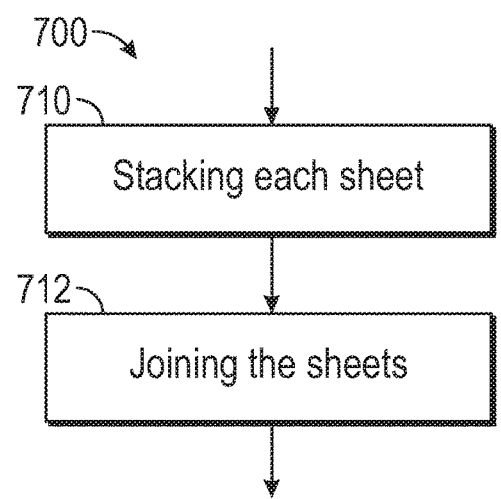
FIG. 7

HEAT SHIELD PANEL MANUFACTURING PROCESS

BACKGROUND

The subject matter disclosed herein generally relates to gas turbine engines and, more particularly, to a method for manufacturing heat shield panels of gas turbine engines.

A combustor of a gas turbine engine may be configured and required to burn fuel in a minimum volume. Such configurations may place substantial heat load on the structure of the combustor (e.g., panels, shell, etc.). Such heat loads may dictate that special consideration is given to structures which may be configured as heat shield panels configured to protect the walls of the combustor. Even with such configurations, excess temperatures at various locations may occur leading to oxidation, cracking, and high thermal stresses of the heat shields or panels. Manufacturing of heat shield panels is a difficult process and improvements to the manufacturing process are greatly desired.

SUMMARY

According to an embodiment, a method of manufacturing a heat shield panel for a gas turbine engine is provided. The method including: determining a plurality of layers to compose a heat shield panel having one or more cooling apertures with complex geometries; forming each of the plurality of layers into sheets; forming each of the sheets into a three-dimensional slice of the heat shield panel; stacking each of the sheets to form a three-dimensional heat shield panel; and joining the sheets together.

In addition to one or more of the features described above, or as an alternative, further embodiments may include that the complex geometries comprise at least one of a spiral passageway, a zig-zag passageway, a branching passageway, a passageway with two or more turns, and a passageway with a curvilinear side wall.

In addition to one or more of the features described above, or as an alternative, further embodiments may include that each sheet is composed of patterned foil.

In addition to one or more of the features described above, or as an alternative, further embodiments may include that forming further includes at least one of chemically etching each of the sheets, photochemically etching each of the sheets, stamping each of the sheets, laser cutting each of the sheets, water jet cutting each of the sheets, and wire or plunge electrical discharge machining each of the sheets.

In addition to one or more of the features described above, or as an alternative, further embodiments may include that forming further includes chemically etching each of the sheets.

In addition to one or more of the features described above, or as an alternative, further embodiments may include that features of each layer are etched into the sheets.

In addition to one or more of the features described above, or as an alternative, further embodiments may include that the features include at least one of one of cooling apertures, quench holes, and an attachment mechanism.

In addition to one or more of the features described above, or as an alternative, further embodiments may include that the attachment mechanism is a threaded stud.

In addition to one or more of the features described above, or as an alternative, further embodiments may include that each sheet is curved individually.

In addition to one or more of the features described above, or as an alternative, further embodiments may include that the sheets are stacked onto a negative template of the heat shield panel.

In addition to one or more of the features described above, or as an alternative, further embodiments may include that the negative template of the heat shield panel is configured to curve each of the sheets into a three-dimensional slice of the heat shield panel.

In addition to one or more of the features described above, or as an alternative, further embodiments may include that the negative template of the heat shield panel is configured to align each of the sheets.

In addition to one or more of the features described above, or as an alternative, further embodiments may include that the negative template includes studs and the negative template of the heat shield panel is configured to align each of the sheets by stacking the sheets onto the negative template such that the studs are inserted through the quench holes.

In addition to one or more of the features described above, or as an alternative, further embodiments may include that the negative template includes studs and the negative template of the heat shield panel is configured to align each of the sheets by stacking the sheets onto the negative template such that the studs are inserted through guide holes in one or more removable portions of the sheet proximate outer edges of the sheet.

In addition to one or more of the features described above, or as an alternative, further embodiments may include: removing the removable portions from the sheets after they have been joined together.

In addition to one or more of the features described above, or as an alternative, further embodiments may include that joining the sheets together further includes at least one of diffusion bonding the sheets together, cold welding the sheets together, ultrasonic metal welding the sheets together, and other solid state welding method the sheets together.

In addition to one or more of the features described above, or as an alternative, further embodiments may include that joining the sheets together further includes diffusion bonding the sheets together.

According to another embodiment, a heat shield panel for a gas turbine engine manufactured by the method of claim 1 is provided. The heat shield panel including: a first surface; a second surface opposite the first surface; and a plurality of cooling apertures extending from the first surface to the second surface through the heat shield panel, each of the plurality of cooling apertures are oriented at a non-normal angle relative to the second surface.

In addition to one or more of the features described above, or as an alternative, further embodiments may include one or more threaded studs extending away from the second surface of the heat shield panel.

In addition to one or more of the features described above, or as an alternative, further embodiments may include one or more quench holes extending from the first surface to the second surface through the heat shield panel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 3A is an enlarged cross-sectional illustration of a heat shield panel and combustion liner of a combustor, in accordance with an embodiment of the disclosure;

FIG. 3B is an top view of airflow passageways for cooling apertures with the heat shield panel of FIG. 3A, in accordance with an embodiment of the disclosure;

FIG. 7 is an illustration of a method of manufacturing the heat shield panel of FIG. 4 and is a continuation the method of FIG. 6, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of heat shield panels of the combustor wall may be used to help cool the combustor. Convective cooling may be achieved by air that is channeled between the heat shield panels and a combustion liner of the combustor. Impingement cooling may be a process of directing relatively cool air from a location exterior to the combustor toward a back or underside of the heat shield panels.

Thus, combustion liners and heat shield panels are utilized to face the extreme temperatures produced by the burning of fuel within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. Heat shield panels often include cooling apertures configured to transfer air from the cooling channel into a combustion area within the combustion chamber. The performance of the cooling apertures may be enhanced through utilizing complex geometries, however complex geometries may lead to difficulties during conventional methods of manufacturing the heat shield panels the heat shield panel, such as, for example investment casting. Embodiment disclosed herein seek to provide a method for manufacturing complex geometries of the heat shield panel.

Figure 1:
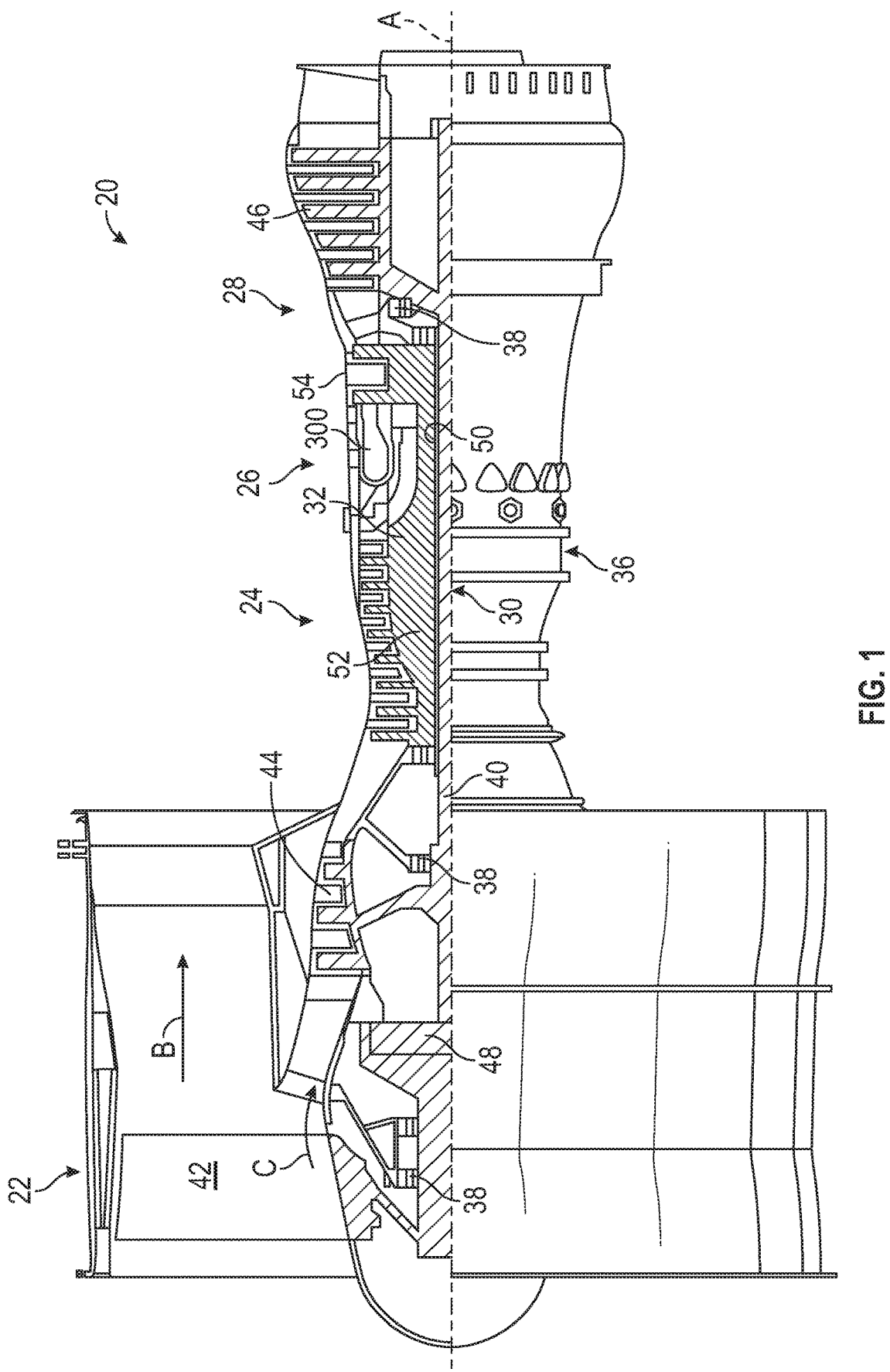
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram~°R)/(518.7°~R)]^{0.5}$. The "Low corrected fan tip speed" as disclosed herein according to one non-limiting embodiment is less than about 1150 ft/second (350.5 m/sec).

Figure 2:
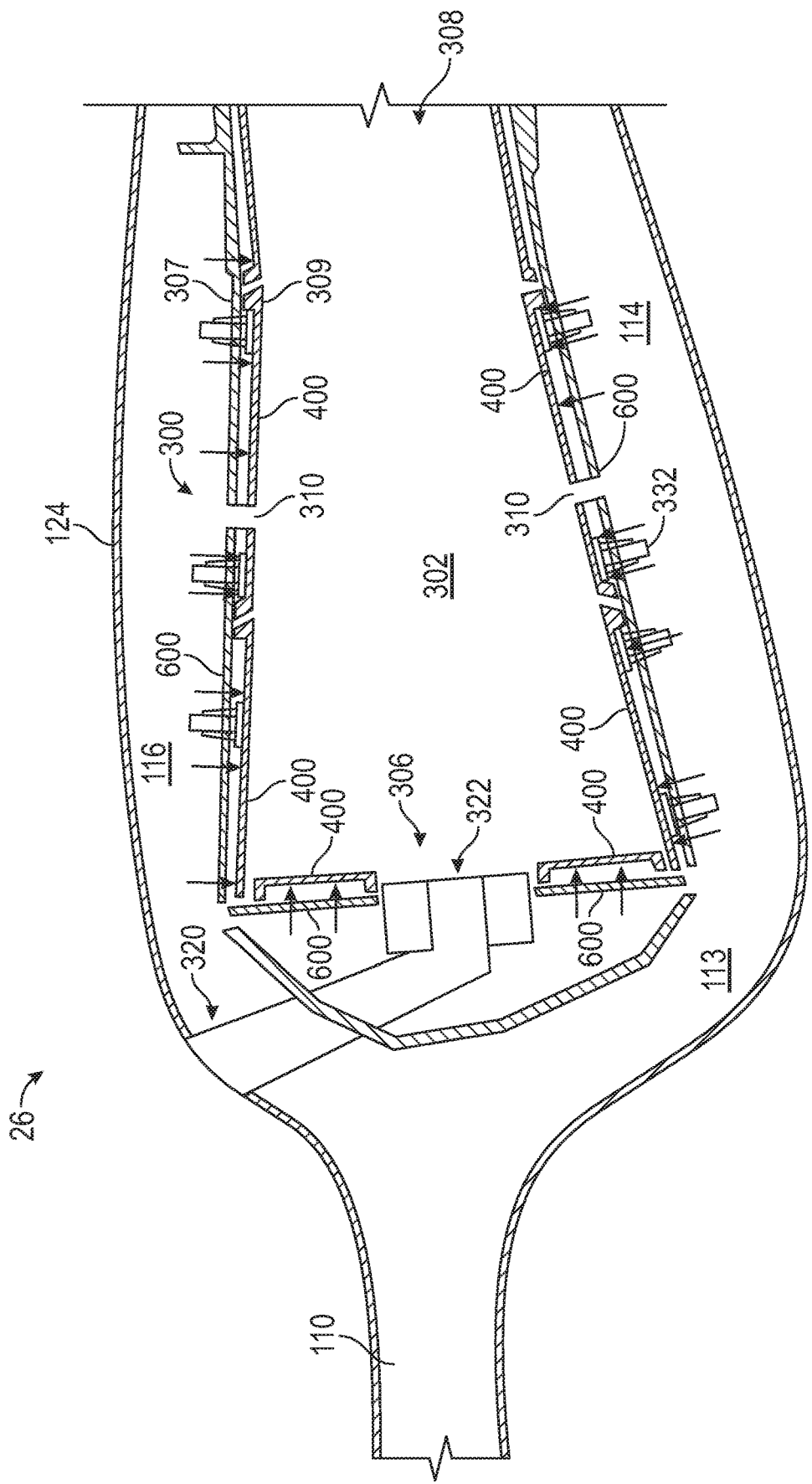
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more impingement holes 307 in the combustion liner 600 and one or more cooling apertures 309 in the heat shield panels 400. The impingement holes 307 and cooling apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 3:
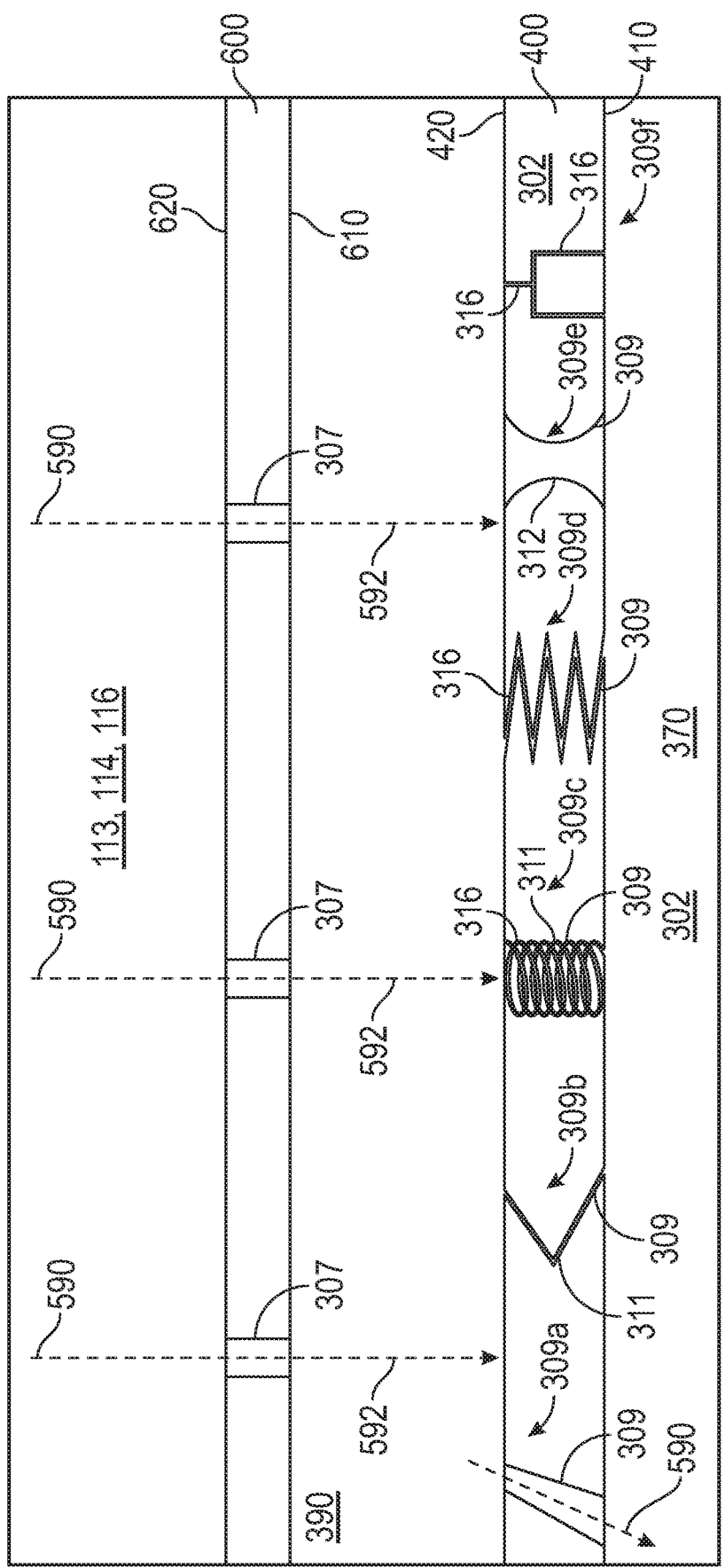
FIG. 3 is an enlarged cross-sectional illustration of a heat shield panel and combustion liner of a combustor, in accordance with an embodiment of the disclosure.

The combustor 300, as shown in FIG. 2, includes multiple heat shield panels 400 that are attached to the combustion liner 600 (See FIG. 3). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a threaded stud or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partially enclose a combustion area 370 within the combustion chamber 302 of the combustor 300.

Figure 4:
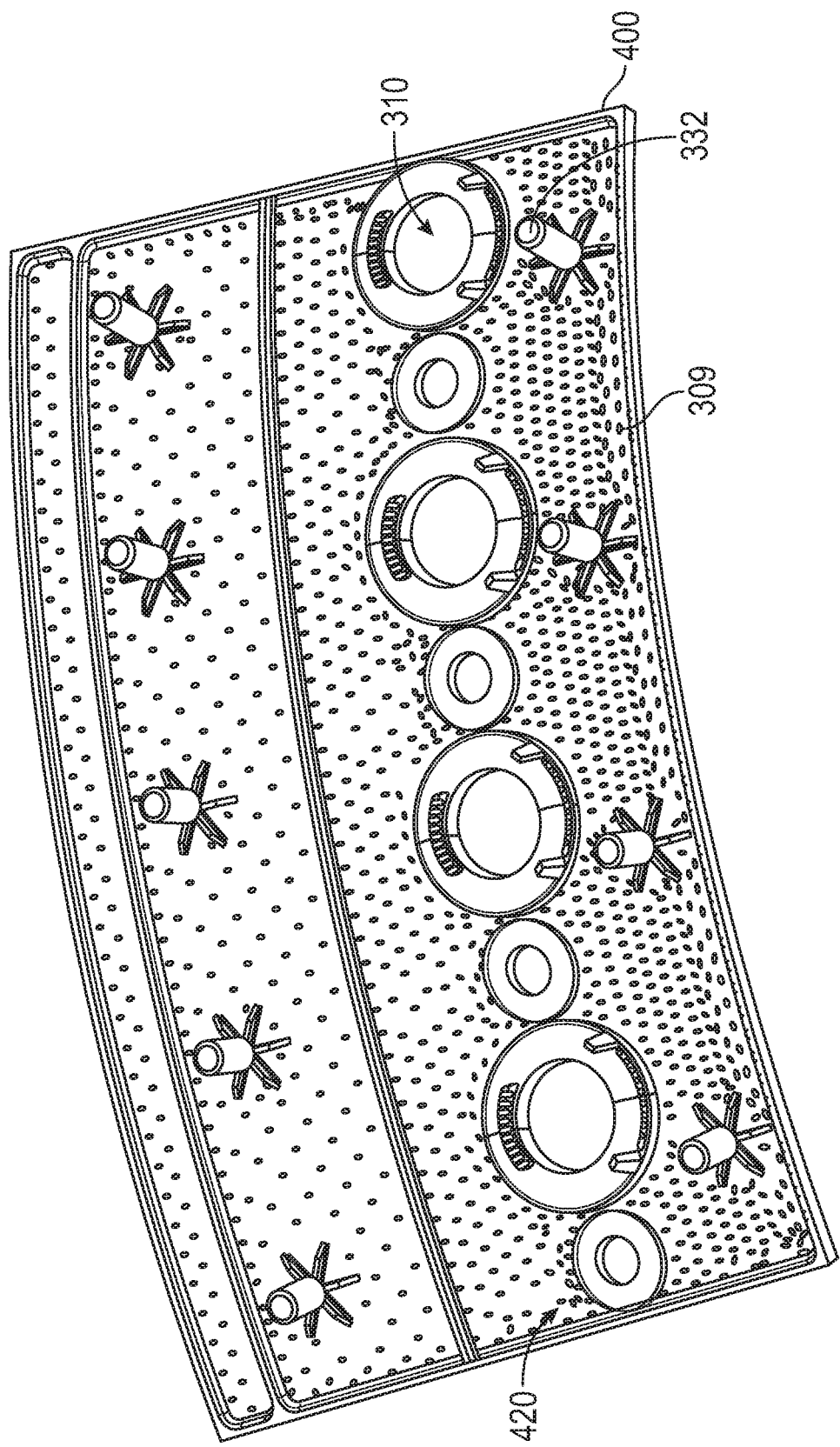
FIG. 4 is an enlarged isometric illustration of a heat shield panel of a combustor, in accordance with an embodiment of the disclosure.

Referring now to FIGS. 3 and 4 with continued reference to FIGS. 1 and 2. FIG. 3 illustrates a heat shield panel 400 and combustion liner 600 of a combustor 300 (see FIG. 1) of a gas turbine engine 20 (see FIG. 1). The heat shield panel 400 and the combustion liner 600 are in a facing spaced relationship. The heat shield panel 400 includes a first surface 410 oriented towards the combustion area 370 of the combustion chamber 302 and a second surface 420 opposite the first surface 410 oriented towards the combustion liner 600. The combustion liner 600 has an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of impingement holes 307 configured to allow airflow 590 from the inner diameter branch 114 and the outer diameter branch 116 to enter an impingement cavity 390 in between the combustion liner 600 and the heat shield panel 400. Each of the impingement holes 307 extend from the outer surface 620 to the inner surface 610 through the combustion liner 600.

Each of the impingement holes 307 fluidly connects the impingement cavity 390 to at least one of the inner diameter branch 114 and the outer diameter branch 116. The heat shield panel 400 may include one or more cooling apertures 309 configured to allow airflow 590 from the impingement cavity 390 to the combustion area 370 of the combustion chamber 302.

Each of the cooling apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420.

As shown in FIG. 4, the heat shield panel 400 contains complex features that may need to be formed during the manufacturing process of the heat shield panel 400. The complex features may include the attachment mechanisms 332 extending away from the second surface 420 of the heat shield panel 400. As shown in FIG. 4, the attachment features 332 may be threaded studs. The complex features may also include the quench holes 310, which may be circular in shape, as shown in FIG. 4. The quench holes 310 may be oriented about perpendicular to the second surface 420 of the heat shield panel 400. The complex features may further include the cooling apertures 309, which also may be circular in shape, as shown in FIG. 4. The cooling apertures 309, may be oriented non-perpendicular to the second surface 420 of the heat shield panel 400.

The heat shield panel 400 is typically manufactured using an investment casting process. To cast the heat shield panels 400 by investment casting, wax needs to be injected into a tool to create wax patterns that will be used to create a ceramic casting mold, which will then be used to cast the metal heat shield panels 400. Having heat shield panels 400 designs with the attachment features 332 that have integral cast threads about parallel (i.e., normal to the stud of the attachment feature 332) to the second surface 420 of the heat shield panel 400 complicates the investment casting process since the threads of the attachment feature 332 cannot be injected directly with the heat shield panels 400 since the angle of the studs and the threads of the attachment features 332 will back lock in the die, which makes it difficult to remove the wax pattern from the injection die. Thus, the threads of the attachment features 332 need to be injected separately in wax and then wax welded to the wax pattern. Casting the heat shield panel 400 and threads of the attachment features 332 separately leads to casting difficulty and quality issues with thread alignment, thread integrity (free from defects like porosity or stray grains), and thread dimensional conformance. This leads to higher process and component cost. Further, the cooling apertures 309 may be oriented at a non-normal angle to the second surface 420 of the heat shield panel 400 or have complex geometries, which make manufacturing the cooling apertures 309 difficult through an investment casting process and other conventional methods.

The cooling apertures 309 may be conventionally formed by various manufacturing methods including but not limited to laser-drilling and electrical discharge machining (EDM) after the heat shield panel 400 has gone through the investment casting process. These methods may be time-intensive and may only create a few cooling apertures 309 at a time. Conventional manufacturing processes (e.g., investment casting process) may only be able to produce simple linear holes, as shown by 309a in FIG. 3. The simple linear holes may have straight linear side walls and at most one turn 311, as shown by 309b in FIG. 3. For example, the cooling apertures 309 at 309b may be produced by drilling two linear holes include one from the first surface 410 and one from second surface 420. Cooling apertures 309 with complex geometries may be formed using method 700 discussed below.

Complex geometries may include two or more turns 311, as shown at 309c and 309d in FIG. 3. Complex geometries may include curvilinear side walls 312, as shown at 309c and 309e in FIG. 3. The curvilinear side walls 312 may be designed to accelerate or decelerate the airflow 590 through the cooling apertures 309.

Complex geometries may include complex shaped airflow passageways 316 to maximize the surface areas for heat flow between the airflow 590 and the heats shield panel 400. Complex shape airflow passageways 316 may include but are not limited to spiral passageways shown at 309c in FIG. 3 and zig-zag passageways 316 shown at 309d in FIG. 3. Complex shaped airflow passageways 316 may include also include branching passageways 316 that branch out in to two or more passageways 316, as shown at 309f in FIG. 3. Additionally, complex shape airflow passageways 317 in FIG. 3a may include also include branching passageways 316 that branch out in to two or more passageways 316, as shown in 309g. The branching passageways 316 may branch out into passageways 316 about parallel to the first surface 410 and/or the second surface 420. The branching passageways 316 may branch out into passageways 316 about parallel to the first surface 410 and/or the second surface 420 on one or more different planes within the heat shield panel 400, as shown at 309g. The passages 316 may interconnect at the inlet 309-1 and/or outlets 309-2 as shown at 309h, interconnect at other points 309-3 as shown at 309i, or not interconnect as shown at 309j. The branching passageways 316 may also fluidly connect two or more different cooling apertures 309.

Advantageously, the method 700 described below allows for fabrication of much more complex cooling apertures 309 than conventional methods, which allows for increase surface area of the cooling apertures resulting in greater overall cooling efficiency for the heat shield panel.

Embodiments disclosed herein seek to address the challenges of manufacturing a heat shield panel 400 using the Tomo Lithographic Molding (TLM) process developed by Mikro Systems, Inc. of Charlottesville, Va. as described in U.S. Pat. No. 9,879,861 B2, which is incorporated herein by reference in its entirety. The TLM process builds up the heat shield panel 400 in layers without the use of castings or cores to produce molds. Advantageously, the heat shield panel 400 is created with the complex features described above during the TLM process without the post processing required by investment casting.

Figure 5:
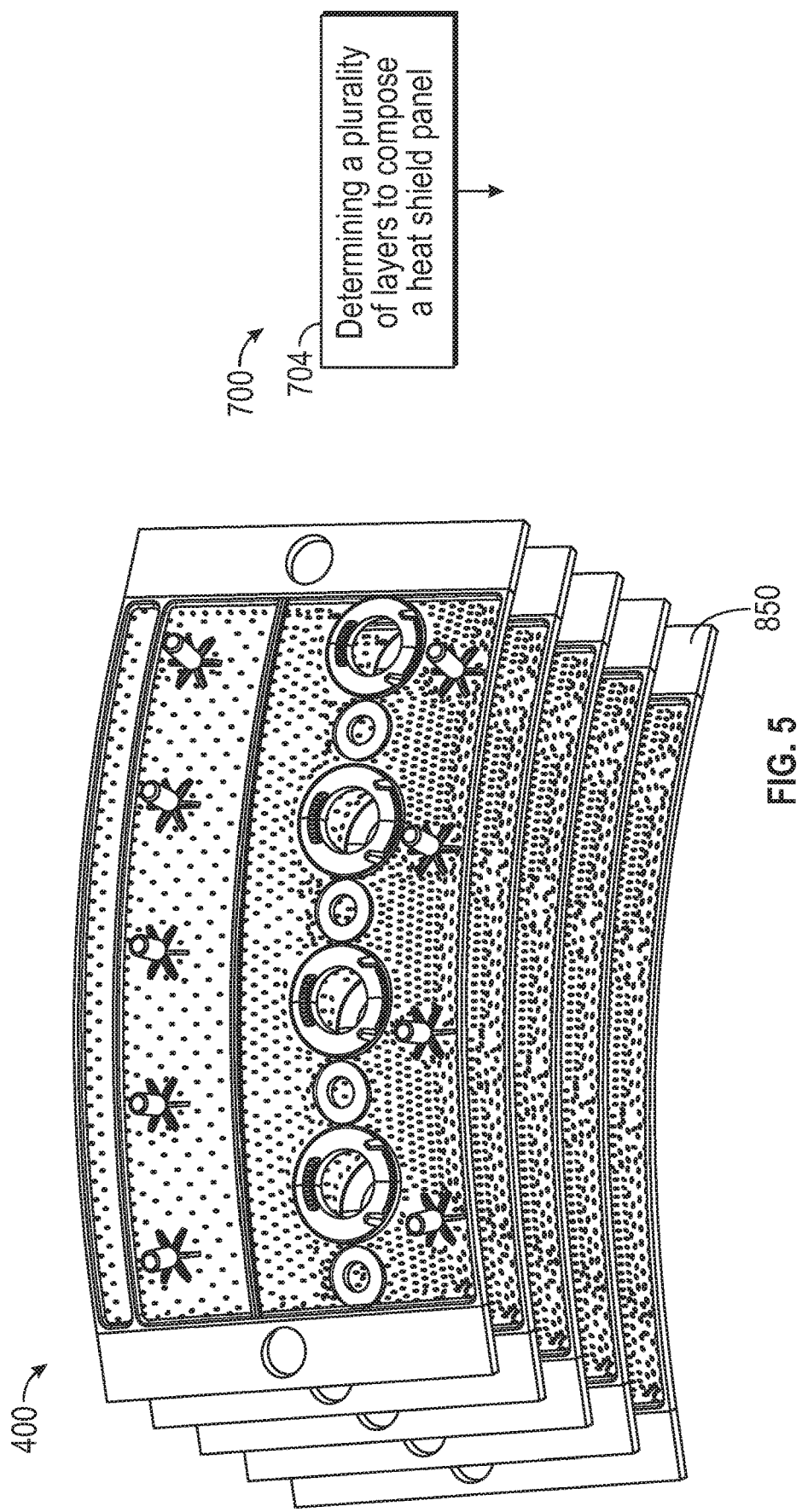
FIG. 5 is an illustration of a method of manufacturing the heat shield panel of FIG. 4, in accordance with an embodiment of the disclosure.
Figure 6:
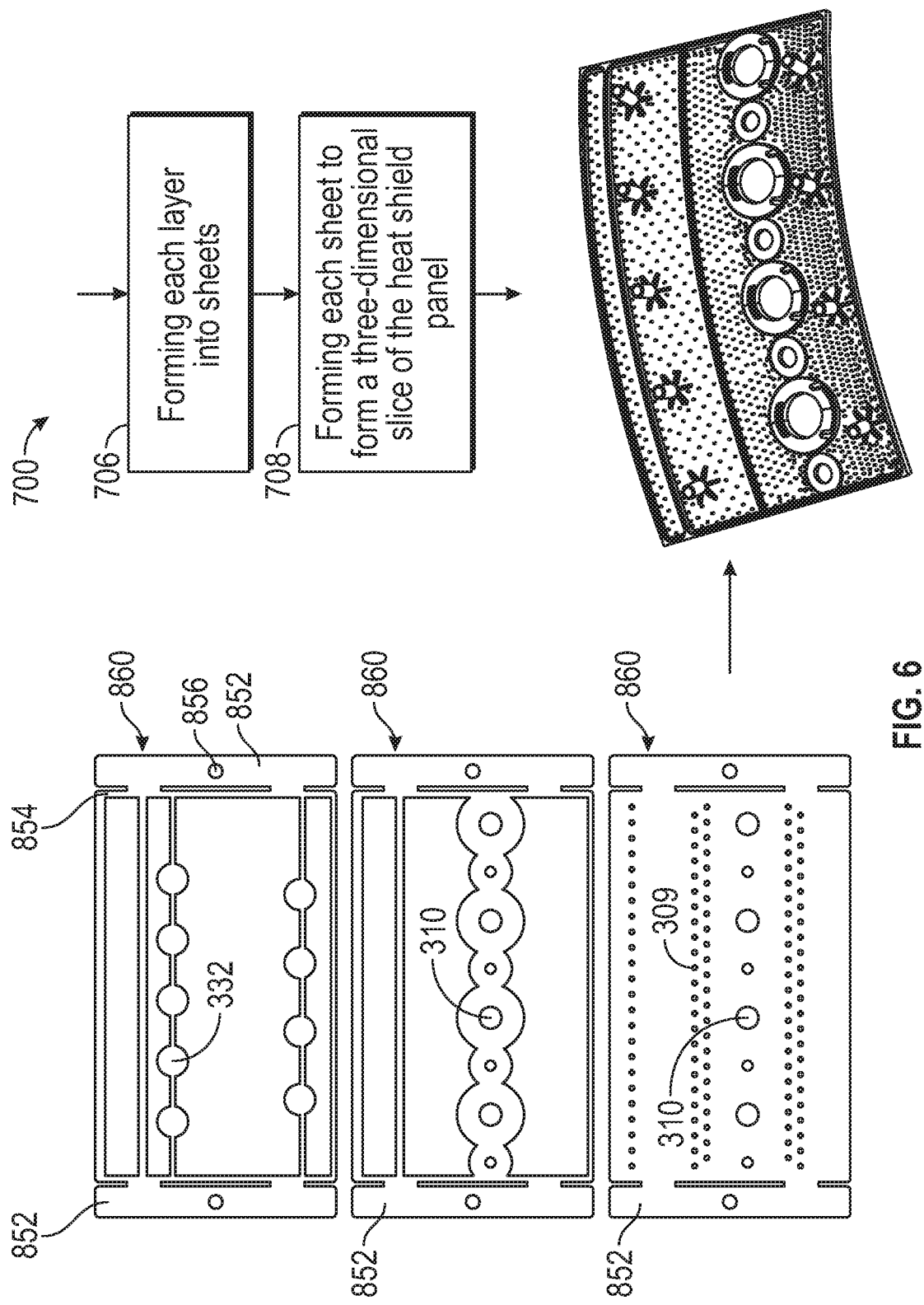
FIG. 6 is an illustration of a method of manufacturing the heat shield panel of FIG. 4 and is a continuation the method of FIG. 5, in accordance with an embodiment of the disclosure.

Referring now to FIGS. 5-7, with continued reference to FIGS. 1-4. FIG. 5-8 illustrates a method 700 of manufacturing the heat shield panel 400. At block 704, a plurality of layers to compose a heat shield panel 400 are determined, which may include segmenting a model of the heat shield panel into a plurality of layers. Block 704 may further include digitally slicing a computer-aided design (CAD) model of the heat shield panel 400 into layers 850. Each layer 850 represents a three-dimensional a slice of the heat shield panel 400 such that when assembled (e.g., laid on top of each other and curved) the layers 850 combine to form the heat shield panel 400. Each layer 850 may be the same thickness or the layers 850 may vary in thickness.

At block 706, the layers 850 are formed by in each of the sheets 860. The sheets 860 may be composed of patterned nickel super-alloy foil. In embodiment, the features may be formed in the foil 860 by any standard available means of machining or patterning metal foils including at least one of chemically etching each sheet 860, photochemically etching each sheet 860, stamping each sheet 860, laser cutting each sheet 860, water jet cutting each sheet 860, and wire or plunge electrical discharge machining each sheet 860. In an embodiment, the features may be formed in the foil 860 by etching features of the layer 850 into a sheet 860. The features of each sheet 860 may be different. Features may include at least one of cooling apertures 309, quench holes 310, and attachment mechanism 332. For example, one sheet 860 may contain features such as the cooling apertures 309, whereas another sheet 860 may contain features such as quench holes 310, whereas another sheet 860 may contain features such as the attachment mechanism 332. The sheets 860 may each include one or more removable portions 852 proximate the outer edges 854 of the sheet 860. Each of the removable portions 854 may include guide holes 856 that aid in the alignment of the sheets 860 later in the method 700, as discussed below.

At block 708, each sheet 860 is formed a three-dimensional slice of the heat shield panel 400. The forming may include flatting and/or curving each sheet 860 as appropriate for the heat shield panel 400. For example, some heat shield panels 400 may be flat, some heat shield panels 400 may be curved, and some heat shield panels 400 may be both flat and curved in different areas of the heat shield panels 400. Each sheet 860 may be curved individually or the sheets 860 may be curved in unison when stacking at block 710.

At block 710, the sheets 860 of etched pattern foil 860 are stacked. The sheets 860 may be stacked onto a negative template 900 of the heat shield panel 400. In an embodiment, the negative template 900 of the heat shield panel 400 is configured to curve each of the sheets 860 into a three-dimensional slice of the heat shield panel 400 in block 708, thus block 708 may be performed simultaneously to block 710 or after block 710.

The negative template 900 may also be configured to align the sheets 860. The negative templates 900 may include one or more studs 910 configured to align the sheets 850. In an embodiment, as shown in FIG. 6, the negative template 910 of the heat shield panel 400 is configured to align each of the sheets 860 by stacking the sheets onto the negative template 900 such that the studs 910 are inserted through guide holes 856 in one or more removable portions 852 of the sheet proximate outer edges 854 of the sheet 860. In another embodiment, are oriented to line up with the quench holes 310 and the negative template 910 of the heat shield panel 400 is configured to align each of the sheets 860 by stacking the sheets 860 onto the negative template 900, such that the studs 910 are inserted through the quench holes 310.

At block 712, the sheets 860 of the etched pattern foil 860 are joined together. Conventional TLM processes may utilize an adhesive to join the sheets 860 together at block 712 however, due to the elevated temperature environment of the a combustor 300 a more heat-tolerant bonding method must be utilized. The sheets 860 may be joined together through various methods including but not limited to at least one of diffusion bonding the sheets 860 together 860, cold welding the sheets 860 together, ultrasonic metal welding the sheets 860 together, or other solid state welding method the sheets 860 together. In an embodiment, the sheets 860 may be joined together through diffusion bonding. The method 700 may further include removing the removable portions 852 of the sheets 860 after the sheets 860 have been joined together. The removable portions 852 may be removed by laser cutting, water jet cutting, wire or plunge electrical discharge machining, conventional milling, or other method of metal cutting known to one of skill in the art.

Technical effects of embodiments of the present disclosure include forming a heat panel by dividing a model of the heat shield panel into a plurality of layers, etching the feature of each of the plurality of layers on to separate sheets, stacking the sheet and then joining the sheets together.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a heat shield panel for a gas turbine engine, the method comprising:
   determining a plurality of layers to compose a heat shield panel having one or more cooling apertures with complex geometries, the heat shield panel including a first surface configured to be oriented towards a combustion area of the gas turbine engine and a second surface opposite the first surface, wherein the cooling apertures pass completely through the heat shield panel from the second surface to the first surface;
   forming each of the plurality of layers into sheets, wherein each sheet is composed of patterned foil;
   forming each of the sheets into a three-dimensional slice of the heat shield panel, wherein forming further comprises at least one of chemically etching each of the sheets, photochemically etching each of the sheets, stamping each of the sheets, laser cutting each of the sheets, water jet cutting each of the sheets, and wire or plunge electrical discharge machining each of the sheets, wherein features of each layer are etched into the sheets, and wherein the features include at least one of cooling apertures, quench holes, and an attachment mechanism;
   stacking each of the sheets to form a three-dimensional heat shield panel, wherein the sheets are stacked onto a negative template of the heat shield pane, wherein the negative template of the heat shield panel is configured to align each of the sheets, and wherein the negative template includes studs and the negative template of the heat shield panel is configured to align each of the sheets by stacking the sheets onto the negative template such that the studs are inserted through guide holes in one or more removable portions of the sheet proximate outer edges of the sheet; and
   joining the sheets together,
   wherein the complex geometries comprise at least one of a spiral passageway, a zig-zag passageway, a branching passageway, a passageway with two or more turns, and a passageway with a curvilinear side wall.

2. The method of claim 1, wherein forming further comprises chemically etching each of the sheets.

3. The method of claim 1, wherein the attachment mechanism is a threaded stud.

4. The method of claim 1, wherein each sheet is curved individually.

5. The method of claim 1, wherein the negative template of the heat shield panel is configured to curve each of the sheets into a three-dimensional slice of the heat shield panel.

6. The method of claim 1, wherein the negative template includes studs and the negative template of the heat shield panel is configured to align each of the sheets by stacking the sheets onto the negative template such that the studs are inserted through the quench holes.

7. The method of claim 1, further comprising:
removing the removable portions from the sheets after they have been joined together.

8. The method of claim 1, wherein joining the sheets together further comprises at least one of diffusion bonding the sheets together, cold welding the sheets together, ultrasonic metal welding the sheets together, and other solid state welding method the sheets together.

9. The method of claim 1, wherein joining the sheets together further comprises diffusion bonding the sheets together.

* * * * *